W. S. BURGESS.
INHERENTLY STABLE FLYING BOAT.
APPLICATION FILED JULY 20, 1916.

1,246,010.

Patented Nov. 6, 1917.
7 SHEETS—SHEET 1.

FIG.1.

Inventor
WILLIAM STARLING BURGESS
By John P. Talbot
Attorney

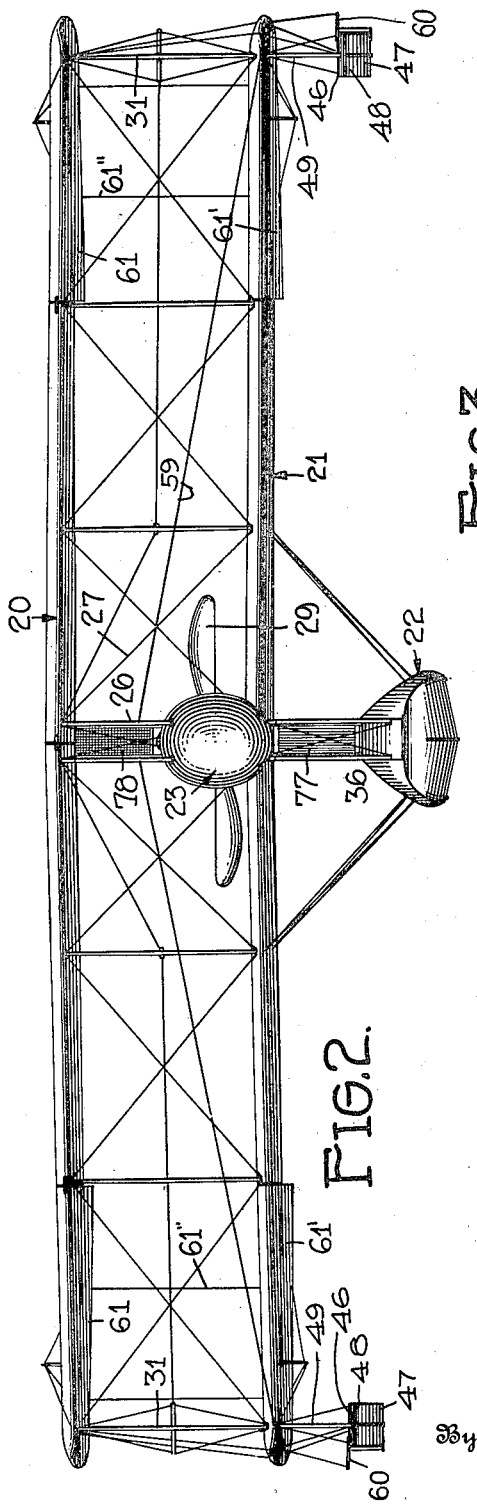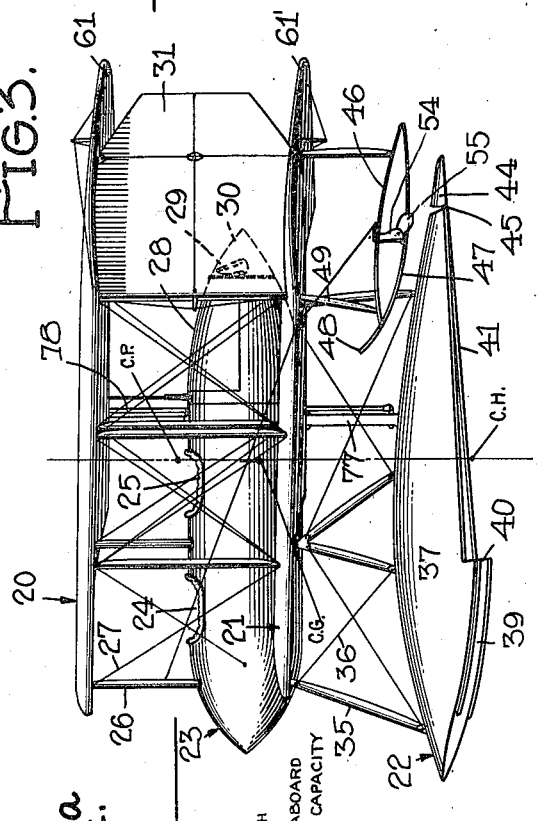

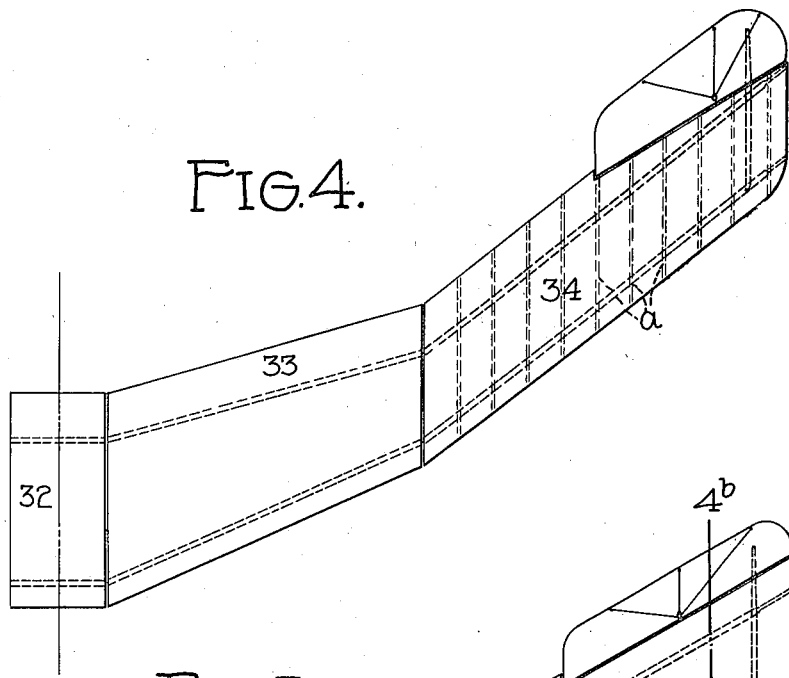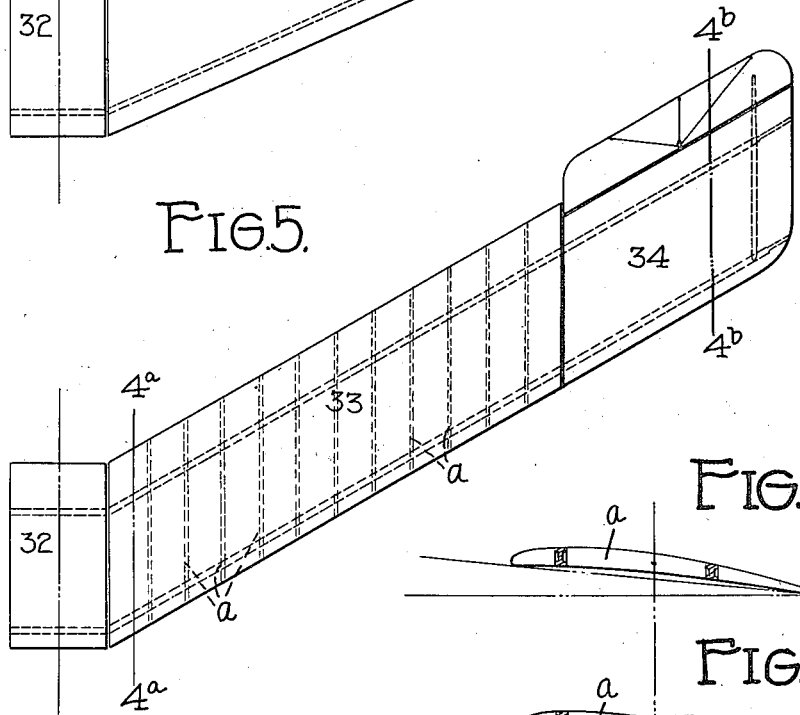

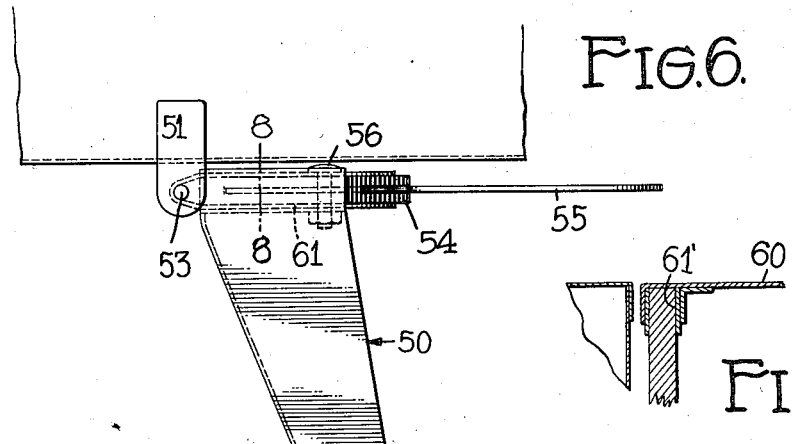
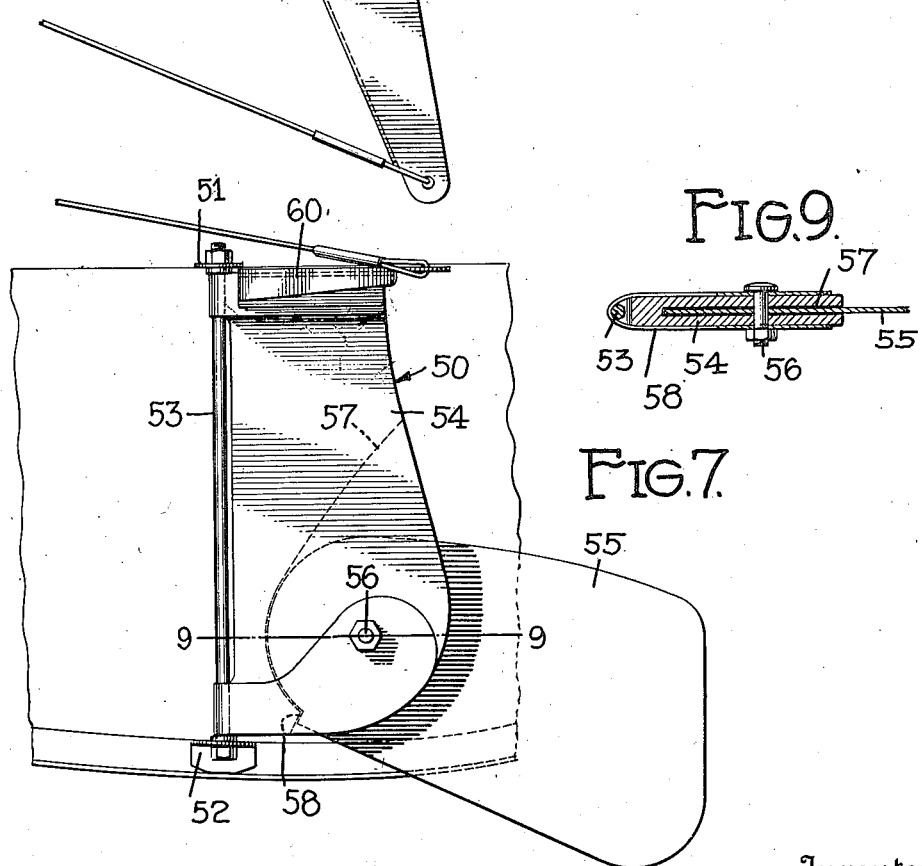

W. S. BURGESS.
INHERENTLY STABLE FLYING BOAT.
APPLICATION FILED JULY 20, 1916.
1,246,010.
Patented Nov. 6, 1917.
7 SHEETS—SHEET 5.
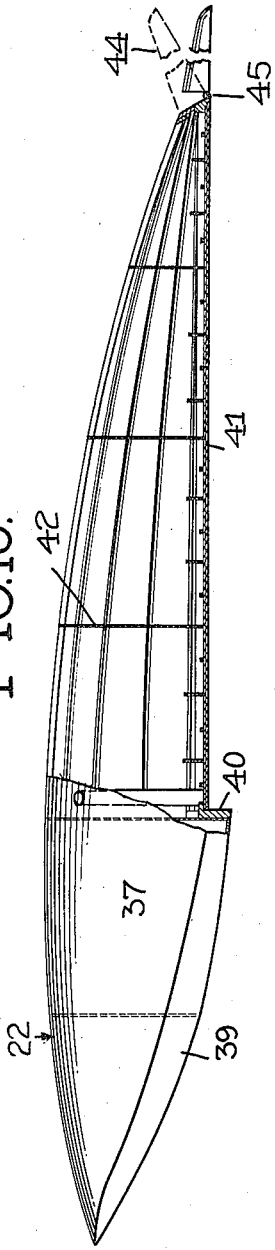
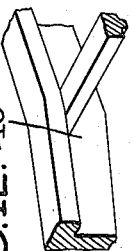
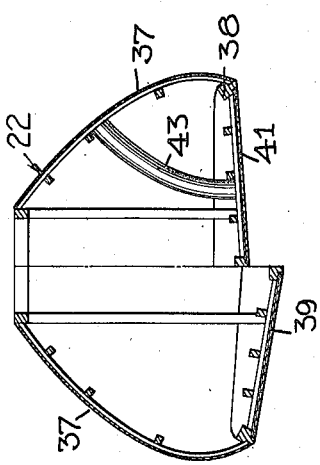
Inventor
WILLIAM STARLING BURGESS.
By
Attorney

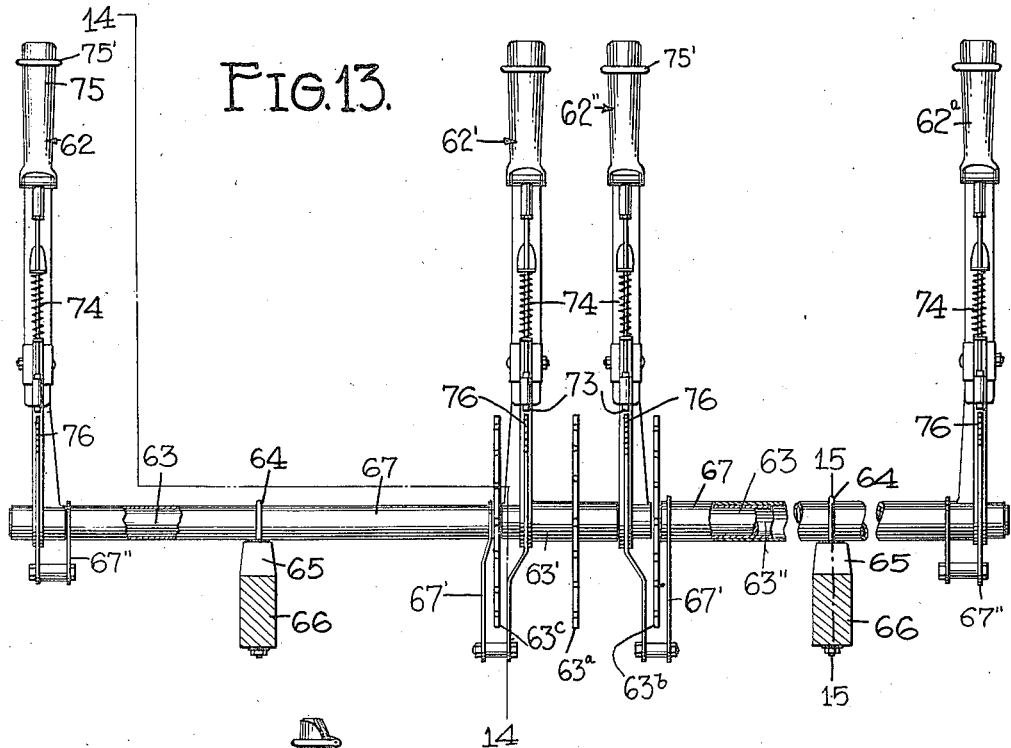
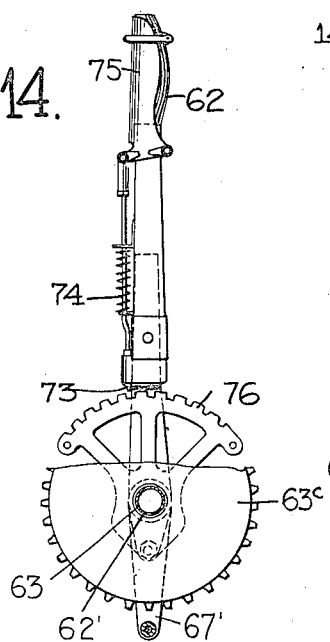
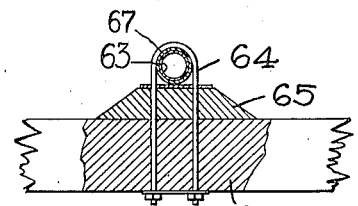
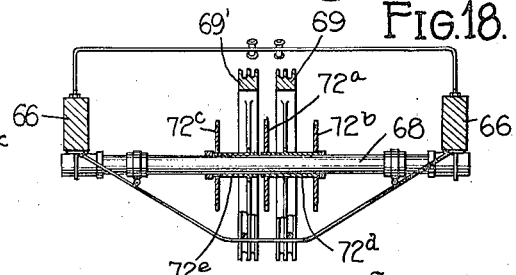

W. S. BURGESS.
INHERENTLY STABLE FLYING BOAT.
APPLICATION FILED JULY 20, 1916.
1,246,010.
Patented Nov. 6, 1917.
7 SHEETS—SHEET 7.
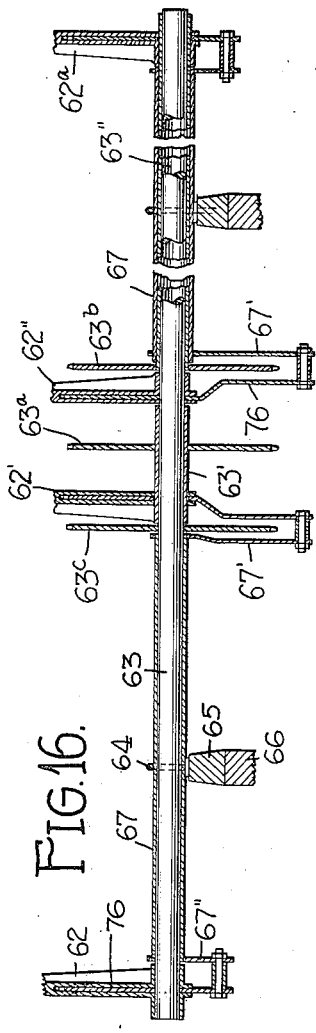
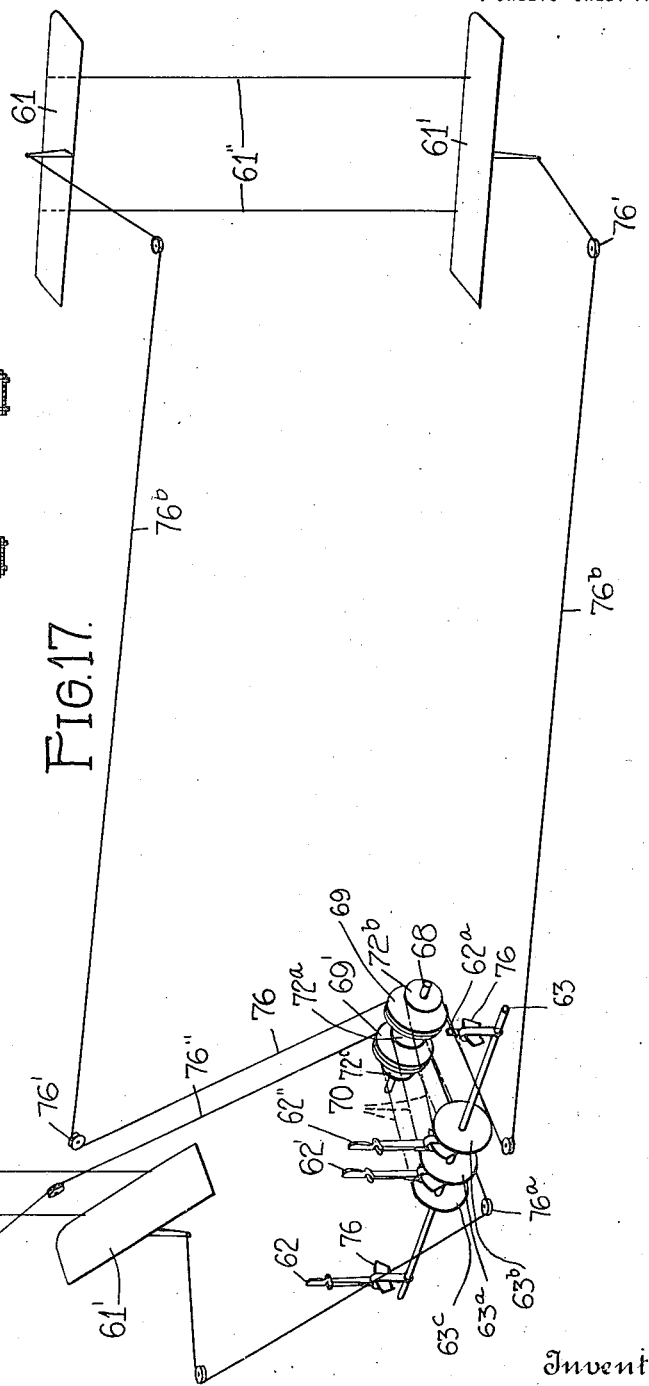
Inventor
WILLIAM STARLING BURGESS.
By
John P. Tarbox
Attorney

UNITED STATES PATENT OFFICE.

WILLIAM STARLING BURGESS, OF MARBLEHEAD, MASSACHUSETTS, ASSIGNOR TO CURTISS AEROPLANE AND MOTOR CORPORATION, A CORPORATION OF NEW YORK.

INHERENTLY-STABLE FLYING-BOAT.

1,246,010.  Specification of Letters Patent.  Patented Nov. 6, 1917.

Application filed July 20, 1916. Serial No. 110,349.

*To all whom it may concern:*

Be it known that I, WILLIAM STARLING BURGESS, a citizen of the United States, residing at Marblehead, in the county of Essex and State of Massachusetts, have invented certain new and useful Improvements in Inherently-Stable Flying-Boats, of which the following is a specification.

My invention relates to aircraft and has reference more particularly to hydroaeroplanes characterized by supporting surfaces of the "Dunne" type.

In the construction of supporting surfaces of the type mentioned, it is essential that the angle of incidence decrease gradually from the inner end out. Wings of this peculiar curvature or structure, under existing conditions, have not been manufactured heretofore except at a very high cost in view of the fact that the various spars, ribs, etc., which constitute the wing are each differently patterned, differently curved, and differently fashioned. No two of these parts could be constructed or formed identically alike. This is an item of strong import and in the design of an aeroplane must be given serious consideration. Rapid production of such wings is extremely difficult if not impossible. These factors have been great drawbacks to the efficient manufacture of the Dunne type of aeroplane. It is to minimize the manufacturing cost, and otherwise generally improve and strengthen the wing structure without departing from the basic principle involved that the present invention is designed.

Broadly, I contemplate the introduction of a novel method of constructing aeroplane wings, which method, fundamentally, may be said to consist in first assembling the various wing parts as for a straight or unwarped wing and thereafter forcibly twisting or distorting the structure to secure the varying angle of incidence required. This method wholly obviates the necessity of constructing the parts of the wing differently. The various rib parts may be made of one pattern and as a consequence the manufacturing cost abruptly reduced. The practice of the method proves it to possess all the advantages claimed for it. After twisting or distorting the wing, rigidity is obtained by tying or trussing the wing in any suitable manner.

A further object of the invention is to provide in a hydroaeroplane an efficient means for steering the craft while hydroplaning, the said means, as hereinafter pointed out being particularly adapted for travel upon the surface of shallow water.

A still further object of the invention is to improve generally in the construction of the several flotation bodies utilized to sustain the craft upon the surface of the water, the main flotation body being equipped with a means whereby immersion, in the event of backward movement, is prevented.

Other objects, advantages and improved results will be hereinafter set forth and the structure whereby the advantages are made possible illustrated is the accompanying drawings, of which:

Figure 1 is a top plan view of my improved hydroaeroplane;

Fig. 2 is a front end elevation;

Fig. 3 is a side elevation;

Figs. 4 and 5 illustrate diagrammatically, different types of wing;

Figs. 4$^a$ and 4$^b$ illustrate diagrammatically the variation in the angle of incidence of the wings, being sections on lines 4$^a$/4$^a$ and 4$^b$/4$^b$ of Fig. 5;

Figs. 5$^a$ and 5$^b$ are views respectively of a wing before and after twisting transversely;

Fig. 6 is a detail top plan view of one of the pontoon-carried steering devices;

Fig. 7 is a side elevation of the steering device illustrated in Fig. 6;

Fig. 8 is a section on the line 8—8 of Fig. 6;

Fig. 9 is a section on the line 9—9 of Fig. 7;

Fig. 10 is a detail side elevation, partly in section, of the main flotation body;

Fig. 11 is an enlarged transverse section of the main flotation body;

Fig. 12 is a fragmentary view illustrating the manner in which the rearwardly facing step is formed;

Fig. 13 illustrates in elevation the several aileron controls;

Fig. 14 is a section on the line 14—14 of Fig. 13;

Fig. 15 is a section on the line 15—15 of Fig. 13;

Fig. 16 illustrates sectionally, the lever interlock;

Fig. 17 is a diagrammatic view illustrating the connection between the several control levers and the ailerons, and Fig. 18 is a sectional view illustrating the drum shaft and the mechanism mounted thereon.

Like numerals of refeence designate like or corresponding parts throughout the several views.

In the embodiment of the invention selected for illustration, 20 designates the upper supporting plane, 21 the lower supporting plane and 22 the main flotation body. Each plane comprises swept back wings of an aspect ratio substantially in duplicate and having an efficient wing curve of any accepted form. As in the Dunne type machine, the wings have a gradually decreasing angle of incidence from their inner end out. The nacelle, designated in its entirety by the numeral 23 is of substantially streamline form equipped with cockpits 24 and 25 tandemly arranged both in advance of a vertical line in the approximate plane of the center of gravity of the machine. Interwing struts 26 and wiring 27 interconnect and brace the planes 20 and 21 throughout.

The propelling power plant designated generally 28 is inclosed almost wholly within the nacelle preferably at the aft end thereof and at the opposite side of the center of gravity to counteract the weight of the occupants and accordingly properly balance the machine. To preclude the formation of vortices at the aft end of the nacelle, the propeller 29 is provided with a conical hub 30 of a circumferential dimension at its base end approximately complemental to the rear terminus of the nacelle. This arrangement is illustrated to advantage in Fig. 1.

As hereinbefore pointed out, much difficulty has been experienced heretofore in constructing the wings of a machine of this character because of the fact that each of the various wing elements must be differently patterned and separately made. By the present invention, it is proposed to obviate the necessity of thus constructing the wings by utilizing an entirely novel principle in the wing construction. Wings of an ordinary construction, consisting of duplicate standardized parts are first assembled (upon an assembly form if desired) and after assembly transversely twisted to assume the angle of incidence required. This method is an important step in the advancement of the aeroplane art. It is not as originally supposed, essential that the wings of the Dunne type machine be of a fragmentary conical form, but that each wing should have a gradually decreasing angle of incidence from its inner end out. The performances of the new wings, upon test, have proven fully as good as those of the original Dunne construction. The cost of manufacture is reduced fully one half.

That the full advantage gained by the radical departure in the wing construction may be thoroughly understood, attention is directed to the fact that in constructing an ordinary aeroplane wing, parallel wing spars (perfectly straight) are first placed side by side and in spaced relation and thereafter interconnected by compression struts and web strips of similar pattern such as $a$, $a$ etc., Fig. 5. After thus assembling the wing parts and tying the wing from end to end, a suitable fabric covering is fastened thereover and the wings accordingly completed. All things considered, the cost and labor incident to the manufacture of an ordinary type of aeroplane wing is but little. As suggested, to construct a wing of the Dunne type would require the use of many different sizes and shapes of web strips and compression struts and would preclude standardization of the component parts. By simply twisting the ordinarily constructed wing after the fashion described, a wing having the characteristics mentioned is produced. See Figs. $5^a$ and $5^b$.

In Figs. 4 and 5, I have illustrated aeroplane wings comprising an engine section panel 32, an inner section 33 and an outer section 34. The inner section 33 (Fig. 4) has a gradually decreasing chord length from its inner end out, while the outer section is of a uniform chord length preferably equal to the chord length of the inner section at its outer end. Said outer section 34, however, is set at a greater angle of retreat or swept back to a greater degree than the inner section 33. Such an arrangement will throw the center of pressure a little farther in advance than would be the case were the wings constructed in the manner illustrated in Figs. 1 and 5. This is advantageous for then the center of gravity may be moved forward. In Fig. 5, the inner section 33 is of a uniform chord length throughout and swept back the same as the outer section 34. The latter section has a somewhat lesser chord length than the inner section 34 in order to provide a jog for the aileron. The ailerons and the manner in which they are manipulated will be hereinafter more particularly disclosed. The engine section panel 32 (illustrated in Figs. 4 and 5) extends approximately at right angles to the line of flight and thus possesses a maximum lift. The utilization of an engine section panel such as that described is further advantageous in that the "beak" characteristic of the Dunne machine is avoided. This beak is not only structurally weak but highly impractical because of the many inconveniences in evidence in the attempted manufacture thereof. The chord depth of the engine section 32 is preferably the same chord length as the inner section 33. By sectionally constructing the supporting surfaces or wings in the manner specified, each section may be independently twisted and distorted and accordingly shaped in a manner found to be most efficient for the service required.

Not unlike the vast majority of hydro-aeroplanes now in existence, the main flotation body 22 is disposed equidistant from the terminals of the supporting surfaces, preferably directly beneath the nacelle, properly arranged chassis struts 35 and wires 36 affording a suitable connection between said body and the nacelle. The flotation body in the embodiment illustrated is of substantially streamline form throughout and of a top surface construction whaleback in form. There are no air obstructing surfaces upon the top of the flotation body. In cross section, the flotation body may be described as substantially triangular although the sides 37 are bulged out slightly beyond the marginal longitudinal edges of the hull structure 38. More specifically, the sides may be said to extend outwardly in diverging relation from the lower marginal edges of the hull for a short distance and thence inwardly and in converging relation to a point of merger at the top of the hull. It is this construction together with the relatively flat underneath hydroplaning surface 39 that gives to the flotation body the substantially triangular formation described. The flotation body at the aft end of the forward hydroplaning surface 39 is provided with a rearwardly facing step 40, said step defining the forward terminal of a tail portion 41 set at an angle different from that of the forward surface. Partitions 42 subdivide the flotation body into non-communicating compartments and brace the structure from end to end. Air vents 43 lead from the top outside surface of the flotation body to the underneath surface thereof at a point immediately aft of the step 40 to break the retarding force that would otherwise be in evidence at this point.

A strong wind counter to the direction of flight might easily cause the machine to ride back and if unchecked in its backward movement, to immerse or submerge by the after ends of the floats, thus heeling backward. This contingency I obviate by the provision of what I shall hereinafter term a tail piece or reverse hydroplaning body denoted 44. The body 44 is comparatively small and of appropriate form to prolong the streamline conformation of the flotation body 22 at its after abruptly terminating end. Said member 44 is preferably hinged at 45 to the main flotation body. While in normal forward flight, the member 44 assumes a position indicated by full lines in Fig. 10 so as to terminate the main flotation body effectually at its aft end. The moment the craft rides backwardly on the water, however, the member 44 will assume a position at an acute angle to the main flotation body and accordingly present a reactionary surface to the water. This positioning of the member 44 will positively preclude immersion of the main flotation body by reason of the reaction of the water thereon as the craft rides back.

Wing pontoons 46 are located beneath the lower plane terminals, each pontoon having a streamlined conformation that the head resistance incident to flight may be reduced. The underneath hydroplaning surface 47 of each pontoon is extended forwardly as indicated at 48 beyond the pontoon body on an upwardly and forwardly inclined curve as illustrated in Fig. 3. Such a construction will add to the hydroplaning surface and insure hydroplaning action even in the event of the pontoon becoming entirely submerged. Struts 49 depend from the lower supporting plane to engage with and support the wing pontoons.

Aeroplanes of the Dunne type rely upon the action of the ailerons to control direction while in the air and for this reason the rudder usually mounted at the aft end is not provided. It is, however, essential that a means be provided whereby the directional changes may be controlled while hydroplaning and it is to this end that the rudder arrangement illustrated to advantage in Figs. 6–9 inclusive is installed. Independently operable rudders, each designated as an entirety by the numeral 50, are mounted, one at the outside of each wing pontoon. Clips or bearings 51 and 52 are mounted respectively adjacent the top and bottom longitudinal outside edges of each wing pontoon and act as supports for a shaft 53 carried thereby. The rudder 50 is made of connected rudder sections 54 and 55, the former being hereinafter referred to as the vertical rudder section and the latter as the horizontal rudder section. The horizontal rudder section 55 is pivoted as at 56 adjacent the lower end of the vertical rudder section 54 for movement in a vertical plane with respect thereto, the inner end of the rudder section 55 engaging in a bifurcation 57 therefor formed in the rudder section 54. A shoulder 58 formed upon the rudder section 55 is so positioned with respect to the inner wall of the bifurcation 57 as to engage therewith in one position of the rudder section 55 and through such engagement maintain the rudder section normally horizontal. As intimated, the shaft 53 acts as a support for the rudder 50. Rudder section 54 is somewhat enlarged at one end (the end engaging with the rudder section 55) since the latter and the corresponding end of the section 54, while hydroplaning, lie beneath the surface of the water and constitute the entire rudder surface. By mounting the rudder section 55 in the manner described, shallow water may be traversed and the machine directed with safety thereover even should the rudder section 55 contact with an obstruction. While in flight, the rudder 50 lies flat against the wing pontoon with which it is associated so as to offer but little head resistance for, in flight, the rudder serves no purpose.

Although any suitable control may be provided for the co-acting rudders 50, I prefer that independent cords 59 be provided. The inner end of each control cord or rudder operating cord as it is more properly termed, should be disposed in convenient proximity to the aviator. Each rudder operating cord is mounted to engage at its opposite end with an arm 60 formed upon the rudder section 54 or if desired, fastened thereto as indicated at 61. By operating the cord 59 so as to extend the rudder surface at the right hand side of the longitudinal axis of the machine at an angle to the pontoon with which it is associated, it is evident that the machine is caused to bodily turn in the direction of said surface.

Coming now to a description of the control mechanism *per se*, it is to be noted that the supporting surfaces 20 and 21 are each provided with ailerons designated respectively 61 and 61'. Aileron cords 61'' interconnect the upper and lower ailerons to thus provide for simultaneous movement. As a manually operated control mechanism for the ailerons 61 and 61', a plurality of control levers have been installed, each of the several levers being mounted for oscillatory movement in a vertical plane longitudinally of the body of the craft. To clarify a description of the operation of the several levers, they have been designated respectively 62, 62', 62'' and 62$^a$, the levers 62 and 62'' being operable to control movement of ailerons 61 and 61' located on the left hand side of the longitudinal axis of the machine and the levers 62' and 62$^a$ operable to control the ailerons located on the right hand side of the machine. Each of the several levers is coaxially mounted on a shaft 63 common to all, the shaft being mounted to extend transversely of the nacelle. The particular arrangement of the levers with respect to each other and with respect to the nacelle is best illustrated in Figs. 13 and 16.

The lever 62$^a$ is fastened to the shaft 63 at one end as is also the lever 62', each of the said two levers constituting the right hand lever of a dual interlocking control. Lever 62', although mounted on the shaft 63 is in no way made secure to the shaft. This is also true of the lever 62$^a$. The former, lever 62', is rigidly connected by any suitable means to a sleeve 63' embracing the shaft 63 intermediate the lever 62' and the lever 62''. The lever 62$^a$ is fixedly secured to a sleeve 63'', likewise embracing the shaft 63 but located intermediate the lever 62'' and the lever 62$^a$. Motion is transmitted from the lever 62' to the sleeve 63' and from the said sleeve to a sprocket 63$^a$ mounted thereon. From the lever 62$^a$, motion is transmitted to the sleeve 63'' and from the said sleeve to sprocket 63$^b$ located adjacent the lever 62'' or at the opposite end of the sleeve from that engaged by the lever 62$^a$. Either or both of the levers 62 and 62'' transmit movement directly to the shaft 63 and from the said shaft 63 to a sprocket 63$^c$ mounted on said shaft adjacent the lever 62'. This arrangement will bring the three sprockets into adjacency, one intermediate the lever 62' and 62'' and the remaining two at opposite sides thereof.

From the several sprockets 63$^a$, 63$^b$ and 63$^c$, motion is transmitted via chains 70 to sprockets 72$^a$, 72$^b$ and 72$^c$, the sprocket 72$^a$ receiving motion directly from the sprocket 63$^a$, the sprocket 72$^b$ from the sprocket 63$^b$ and the sprocket 72$^c$ from the sprocket 63$^c$. Sprockets 72$^a$ and 72$^b$ have a rigid connection with a sleeve 72$^d$ whereby motion is transmitted to a drum 69 mounted on said sleeve. The sprocket 72$^c$ is mounted on a sleeve 72$^e$, which sleeve, like the sleeve 72$^d$, carries a drum 69'. Both sleeves embrace a shaft 68 mounted to extend transversely of the nacelle in parallelism with the shaft 63. The manner in which the shaft 68 and its associate mechanism is arranged with respect to the nacelle is best illustrated in Fig. 18.

Leads or aileron operating cords 76$^b$ extend from the drum 69 to the ailerons 61 and 61' at one side of the machine, the cords, as illustrated, engaging with pulleys 76' conveniently located upon the machine. The ailerons at the right hand side of the machine are thus controlled. To control the ailerons at the left hand side of the machine, aileron operating cords 76'' lead from the drum 69' over pulleys 76$^a$ to the ailerons 61 and 61' at the left hand side of the machine.

In order that each of the several control levers may be properly arranged in axial alinement and upon a common shaft, it is preferred that the relative location thereof be as above specified. It is also desirable that a means be provided whereby the ailerons may be releasably maintained in a fixed or adjusted position and to this end suitable pawl and quadrant mechanism is provided. Each lever is equipped with a pawl 73 spring pressed as indicated at 74, the pawl when released, being adapted for engagement with the teeth of a quadrant or sector 76. Each sector is maintained stationary with respect to the machine body or nacelle by means of a somewhat novel bridge connection between adjacent sectors. At each side of the centrally disposed levers 62′ and 62″, a sleeve 67 is disposed, the sleeve in each instance embracing the shaft to accordingly act as a bearing therefor. A bridge structure 67′ is located at the inner terminal of each sleeve 67 to bridge respectively the sprocket 63$^b$ and 63$^c$ and at the same time maintain the centrally located sectors 76 rigid with respect to the levers 62′ and 62″ mounted for operative association therewith. At the opposite end of each sleeve a bridge structure 67″ of lesser size is disposed for an obvious purpose.

Inverted U-shaped bolts 64 afford a fastening means for the alined sleeves 67, each bolt embracing its associated sleeve, the upper longerons 66 of the nacelle and a suitable spacing block 65 located intermediate the longerons and the sleeve. See Fig. 15.

In operation, and as suggested, either or both of the levers 62 and 62″ may be manipulated to control the ailerons on the left hand side of the machine and either or both of the levers 62′ and 62$^a$ to control the ailerons on the right hand side of the machine. This arrangement is not only convenient and practical but of such a nature as to preclude the likelihood of a mistake through carelessness should the aviator change his seat or shift his position from one to the other side of the machine. Right and left hand levers in each instance (referring to the dual control) operate the same ailerons.

The pawls 73 may be normally held out of engagement with the sectors 76 by means of a link 75′ fastened, one to each control lever, and adapted for engagement with an associate pawl operating lever 75 mounted adjacent the free end of each control lever. To lock the ailerons in adjusted position it is but necessary that the pawl operating lever be released.

Both sets of control levers are to be operated when it is desired that the machine be subjected to dual control. Under these conditions, the links 75′ are removed from engagement with the pawl operating levers 75 and the springs 74 accordingly released. The operator's grip upon the control levers is such as to maintain the pawls out of engagement with the sectors, and the links 75′ are to be used for this purpose only when the machine is under the control of one operator or when one of two operators decides to quit control. The levers 62 and 62″ and the levers 62′ and 62$^a$ must move in unison.

While in the foregoing there has been illustrated in the drawings and described in the specification such a combination and arrangement of elements as constitute the preferred construction or embodiment of the invention, it is nevertheless desired to emphasize the fact that interpretation of the invention should only be conclusive when made in the light of the subjoined claims.

What is claimed is:

1. The method of constructing aeroplane wings which consists in assembling wing parts of similar pattern in a common plane and thereafter distorting the assembled wing transversely to produce a finished wing having an angle of incidence gradually decreasing toward one end.

2. The method of constructing aeroplane wings which consists in first assembling wing parts of similar pattern to produce a complete wing having a uniform angle of incidence throughout, and thereafter forcibly distorting the completely assembled wing transversely to obtain a finished wing having a gradually decreasing angle of incidence from its inner end out.

3. The method of constructing aeroplane wings of the "Dunne" type which consists in first assembling the wing parts, and thereafter forcibly twisting the wing to secure the angle of incidence required.

4. The method of constructing aeroplane wings of the "Dunne" type which consists in first assembling the wing parts in a manner productive of a complete wing having a uniform angle of incidence throughout, thereafter forcibly twisting the wing transversely to obtain the angle of incidence required and finally securely fastening the wing in the particular twisted state found to be most efficient.

5. In an aircraft, a propelling means, and swept back supporting planes made up of separable sections, each section having an angle of retreat at variance with the section adjacent to it.

6. In an aircraft, a propelling means, and swept back supporting surfaces made up of separable sections, the chord line of one of said sections decreasing continuously from its inner end out.

7. In an aircraft, a propelling means, and swept back supporting surfaces made up of separable sections, the inner section of each surface decreasing in depth from its inner end out and the outer section of each surface having an invariable chord line throughout.

8. In an aircraft, a propelling means, and a swept back supporting surface made up of separable sections, the chord line of one of said sections being at variance with the chord line of another.

In testimony whereof I affix my signature.

WILLIAM STARLING BURGESS.

Witnesses:
 NELSON MONETTE,
 CHARLES W. FREETO.